United States Patent Office 3,410,943
Patented Nov. 12, 1968

3,410,943
METHOD OF IMPARTING HIGH GLOSS AND STAIN-RESISTANCE TO THERMOSETTING MOLDED ARTICLES
Frank B. Rosenberger, Maumee, and Corwin R. Brandt, Toledo, Ohio, assignors to Allied Chemical Corporation, New York, N.Y., a corporation of New York
No Drawing. Filed May 20, 1960, Ser. No. 30,435
11 Claims. (Cl. 264—255)

This invention relates generally to the application of a coating to thermosetting molded articles and more particularly to methods for imparting smooth glossy and/or stain-resistant surfaces to synthetic resin tableware.

Various attempts have been made to produce melamine tableware with a high gloss surface similar to high quality china tableware. The lack of a glossy surface is particularly pronounced in the case of decorated melamine tableware where the decoration or design is applied to the piece by molding a "foil" or overlay on the top surface of the part as the final step in the molding operation. The design is printed on paper impregnated with melamine resin. This foil or overlay is placed on the surface of a partially cured melamine molding and the cure completed so that the foil and design become an integral part of the molded article. The pieces thus produced, due to the presence of the resin-paper overlay, generally possess a slightly less glossy surface than undecorated molded melamine.

One of the methods suggested to increase gloss comprises increasing of the cure time used in the molding cycle. A certain gain in gloss can be achieved in this manner, but this gloss is substantially less than that of good china and the increased cure time is economically objectionable for the benefits received. The molded article also becomes slightly discolored when subjected to the increased cure.

Another method suggested to increase gloss comprises increasing of the amount of melamine resin in the foil or overlay, the theory being that some of the resin will remain at the surface and form a film of clear cured melamine resin with a glass-like appearance. This approach provides some measure of improvement in gloss, but the increased resin makes the foils brittle and difficult to handle in the manufacturing process and also seriously complicates the problem of printing the foils. In addition, such a high resin content causes molds to be fouled with excess resin which causes subsequently-molded pieces to stick to the mold force and thus be removed from the mold cavity when the mold is opened, instead of remaining in the mold cavity to permit the desired application of the foils to the molded pieces.

Another serious shortcoming of melamine tableware has been its staining by certain food items. The staining of cups by coffee is particularly noticeable. Certain constituents of coffee appear to attack the melamine surface and deposit an undesirable brown or black discoloration which is removed only by special chemical agents. Since restaurants and institutions which use automatic dishwashing equipment do not have time nor facilities for removing the coffee stains, the use of melamine tableware has been very limited in these establishments. The acceptance of melamine tableware in homes has similarly been limited by the poor resistance thereof to coffee staining.

U.S. Patent 2,781,553 describes a process for spraying the force or male member of the coffee cup mold with a solution of a stain-resistant resin, allowing the solvent to evaporate and then molding a cup in the conventional manner so that a thin, hard, stain-resistant coating is applied to the inner surface of the cup. While this process produces some improvement in coffee stain resistance, it has several shortcomings. Primarily, specialized spraying equipment must be installed by a molder using this process. Special equipment for the manufacturing and/or storage of the relatively unstable liquid resin solution is also necessary. Further, the time necessary for spraying the force and allowing the solvent to evaporate lengthens the total time consumed to produce a cup to a point where its commercial feasibility is very questionable. In addition, the actual technique of resin application by this method is quite detailed, cumbersome and is not readily adaptable to continuous, semi-automatic tableware molding as now practiced by molders.

It is a primary object of the present invention to mold articles of thermosetting plastics, and particularly melamine tableware having a smooth, high-gloss, stain-resistant surface comparable in degree of gloss to that of high quality chinaware.

Another object of this invention is to mold these pieces without extending the cure time so as to cause discoloration of the part or to require such a long cure period so as to be economically prohibitive.

Still another object of this invention is to mold decorated high-gloss melamine pieces without the use of special high-resin-content foils.

Another object of this invention is to provide a method of surfacing tableware with a high-gloss, stain-resistant film in such a manner that the film will have outstanding resistance to cracking and crazing when exposed to abrupt changes in temperature.

Yet another object of the invention is to provide a method of molding cups that have a smooth, hard, coffee stain-resistant inner surface.

Another object is to provide a method of molding tableware that attains the aforesaid objects without the necessity for any specialized or expensive equipment other than the conventional molding press itself.

The above-noted and other objects are obtained by a process in accordance with our invention, wherein synthetic resin objects having smooth, glossy and stain-resistant characteristics are produced by introducing into a molding zone, a charge comprising a molding compound of a fusible, thermosetting resin of the group consisting of urea- and melamine-aldehyde resins; molding said charge while in said molding zone into a partially cured molded object; introducing on at least one surface of said object; a granular, fusible, thermosetting resin of the group consisting of melamine- and benzoguanamine-aldehyde resins and which, as measured by "Flow Time Determination" (as hereinafter defined) has a flow time of from 1 to 15 seconds; continuing molding of said charge with said granular, fusible, thermosetting resin thereon at a rate to cause flow of said granular, fusible, thermosetting resin uniformly over the surface of said object prior to final curing of said charge and said fusible, thermosetting resin thereon; and thereafter, continuing molding until said charge and said flowed resin thereon are finally cured as an integral object.

A suitable stain-resistant resin material that will impart a high gloss to synthetic resin tableware when applied in accordance with the invention may be made by reacting crystalline melamine with formaldehyde, then modifying the resultant condensation product by the addition of curing catalysts and other minor additives that are conventional in this art. For example, zinc sulfate, oxalic acid, benzoic acid, phthalic acid, hydrobromocinnamic acid, benzoyl peroxide, and ethylene bis benzenesulfonate may be included as curing catalysts, and optical brighteners, coloring materials, such as titanium dioxide, ultra marine blue, cadmium red, phthalocyanine green, and pearlescent pigments may be added as minor additives as desired, all as generally conventional in the melamine resin coating art. When such resins are employed in accordance with the present invention, however, the mol ratios of formaldehyde to melamine may vary between 1.5 to 1 and 6 to 1. The ratio of 2.1 to 1 is preferred.

Another suitable high-gloss, unfilled resinous material having slightly greater resistance to food staining than the melamine-formaldehyde resin referred to above may be prepared by reacting crystalline benzoguanamine, crystalline melamine and formaldehyde and modifying the resultant co-condensation product with conventional catalysts and other minor additives as already referred to in the case of melamine-formaldehyde resins. While benzoguanamine may be used as sole amine, its advantages may be obtained in large measure by use of small proportions with melamine, and its higher cost and poorer light fastness after curing favor use of such mixtures. Particularly useful in the method of the invention are such mixed resins wherein the molar proportions of benzoguanamine to melamine may vary between 1 to 1 and 1 to 8, with the ratio of 1 to 6 preferred. The total benzoguanamine and melamine ratio to formaldehyde may vary as in the case of melamine alone to formaldehyde, as set forth above.

While formaldehyde is preferred as the aldehyde reactant, paraformaldehyde or other aldehyde or mixtures thereof may be used instead as is well known in the art. For example, other aldehydes that may be employed are acetaldehyde, butyraldehyde, propionaldehyde, crotonaldehyde, benzaldehyde, and furfural.

Preparations of exemplary resin solutions that may be employed after suitable treatment as granular, solid coating materials in the method of our present invention are given below:

RESIN "A"

(Melamine-formaldehyde)

Eight hundred and eighty-three grams of melamine are added to 1137 grams of formaldehyde (37%) solution at pH 8.2 and 50° C. The mixture is heated to reflux with stirring and maintained at reflux until a cloud point or hydrophobe of 27° C. is reached, after which the mixture is cooled and 104 grams of water are added.

RESIN "B"

(Benzoguanamine-melamine-formaldehyde)

Eight hundred and sixteen grams of melamine and 203 grams of benzoguanamine are added to 1137 grams of formaldehyde (37%) solution at pH 8.2 and 50° C. The mixture is heated to reflux with stirring and maintained at reflux until a cloud point or hydrophobe of 27° C. is reached, after which the mixture is cooled and 104 grams of water are added.

The above resin solutions can be changed to the solid state (powder or granular) by various techniques such as oven drying, differential roll milling and spray drying, after which the various additives can be dry blended into the resin. The method given below is preferred.

From 0.15% to 0.45% (based on the weight of the resin solution) of zinc sulfate (12.5%) solution is added to the resin solution as a catalyst to accelerate cure time in the mold. Then 60 to 120 parts per million of an optical brightener (such as Calco-Acetate Fluorescent Blue I of American Cyanamid Company) are stirred into the resin. The optical brightener fluoresces under ultraviolet light and hence provides a simple inspection technique for determining whether the resin has uniformly coated the entire surface of the molded part. Substitution of a pigment or dye for the optical brightener will serve the same purpose, or, if desired, the optical brightener or other indicator may be omitted entirely.

After the addition of the above components, the mixture is then maintained at room temperature for a period of about 6 to 8 hours or until it becomes a thixotropic paste. The paste is poured into flat noncorrodible pans and heated for 6 to 8 hours at 150° F. in a circulating air oven. At the end of this time, the solid or semi-solid material is milled (densified) on a differential speed roll mill (roll temperature of 220° F.), and the resultant milled sheet is ground in a hammer mill. Zinc stearate (1%), a lubricant, is added to a granular product.

In the molding of synthetic resin objects of generally dished configuration, such as plates, coffee cups, and other tableware, it is conventional to employ as molding compounds, filled melamine-formaldehyde thermosetting resin compositions that may optionally contain other compatible amine constituents, such as benzoguanamine. Alpha cellulose is usually included as filler component although other filler components may be substituted or included. Also used as thermosetting resin component for such molding compounds, although less frequently at present, are urea-formaldehyde resins. For the molding operations per se, it is conventional to have the mold-cavity member of the mold disposed vertically with the opening thereof facing upward. Accordingly, the force or male member of the mold is similarly disposed and mounted to permit vertically downward movement thereof into co-active molding relationship with the mold-cavity member during the molding operation to form the generally concave upper surface of the object. At the end of the molding cycle, the force is lifted vertically out of the mold cavity to permit removal of the molded, dished object and insertion of another charge for a subsequent molding operation. During such conventional molding operations, it is customary to apply to the mold, temperatures ranging from 300° F. to 350° F. and to apply to the force, pressures ranging from 2000 p.s.i. to 8000 p.s.i., which are applied for periods ranging from 30 seconds to 90 seconds.

A procedure in accordance with the present invention for molding an object with a smooth, hard, stain-resistant surface is given below.

The mold cavity of a mold that may be of the conventional design referred to above is charged with a suitable weight of a thermosetting resin molding composition of the type employed in the production of synthetic resin tableware as also referred to above, and closed for the required time by lowering the force into the charged cavity and applying heat and pressure, preferably within the ranges set forth above. The mold is opened, preferably in from 25–70 seconds, before the charge is completely cured, and a quantity of the granular, solid, stain-resistant resinous product of the type contemplated by this invention is introduced on the formed generally concave surface of the charge, preferably centrally thereof. The quantity of said resin product so introduced is preferably the amount that is sufficient when molten to coat uniformly the generally concave surface of the molded part desired, with a thin film. At this point the mold is closed by slowly lowering the force to permit the coating material to achieve its greatest liquid state while the force is still in motion and to allow the liquid or semisolid material to flow outwardly and upwardly against gravity along said generally concave surface to cover it uniformly with a thin film of resin. The mold is thereafter allowed to close completely by full lowering of the force and remains closed, preferably for from 20–90 seconds, until the thin film of coating material and the partially cured charge are cured, by the application of heat and pressure as during the initial partial cure of the charge, to a blister-free state. The mold is subsequently opened by lifting the force, and the molded object with integral high-gloss, stain-resistant surface is removed to permit repeated molding cycles.

When a resin-impregnated imprinted foil is to be utilized, as is conventional, for example, in the production of decoratively surfaced dishware; in accordance with the present invention, the foil is introduced on the surface of the partially cured object and the object, with the foil thereon, is subjected to another molding cycle under the same pressure and temperature conditions as already described, preferably of from 15–45 seconds duration. Thereafter, the granular, solid, stain-resistant resinous coating material is applied and the object finally cured as described above for objects to which no foil is applied.

The plasticity or viscosity of the high-gloss and stain-resistant insert material has been found to be of primary importance in successfully molding synthetic resin tableware generally with high-gloss and stain-resistant surfaces by the molding procedure of the present invention. Such plasticity or viscosity of said material within certain limits as measured under certain conditions of temperatures and pressures, all as hereinafter described, results in optimum advantages upon application of the invention to the molding of melamine-formaldehyde cups and dishes particularly.

To measure the plasticity of thermosetting materials, various methods are commonly used in the plastics industry. A preferable method is described below:

FLOW TIME DETERMINATION

A mold is used which produces a tumbler or cup 4 inches high with outside diameters of 2⅞ inches at the top and 2 inches at the bottom, the outside radius of juncture of sidewall and bottom being 3/16 inch, and the inside radius ⅜ inch with wall thickness of 1/16 inch. The mold is maintained at 300° F. in the press with a closing speed of 180 inches per minute. Line pressure is maintained so that pressure exerted is approximately 5,400 pounds per square inch on the molded part.

A preformed charge of the material to be tested is placed in the mold cavity and the mold closed. The period of time between the instant full pressure is exerted on the charge and the instant the material stops flowing in the mold (as indicated by the ceasing of motion of the excess material or "Flash" at the juncture of the mold halves) is measured with a stopwatch and is reported as the "Flow" in seconds. Thus a "soft" plasticity material may have a flow of 3 seconds and a "stiff" plasticity material a flow of 20 seconds at the temperature conditions referred to above.

Resins "A" and "B" when prepared and granulated as herein described and tested for plasticity in the above manner showed flows between 2 and 10 seconds. It has been determined that in the molding of high-gloss and stain-resistant dished objects generally, material with a flow time of over 15 seconds is too stiff; i.e., it will not completely cover the surface of the molding to which it is desired to impart a high-gloss surface. It has also been determined that the surfacing material can be too soft in plasticity. For example, a resin with a flow time of 1 second will flow completely over the top surface of a piece having a comparatively small order of concavity; e.g., a plate, but, some of the resin flashes out (flows completely out) of the mold with the result that the increase in gloss obtained is slightly less than is obtained by using a stiffer resin. The optimum flow time for a high-gloss, stain-resistant coating resin for dished tableware having said comparatively small order of concavity is 2 to 7 seconds.

The following examples will serve to illustrate the invention as applied to the production of dished tableware having a comparatively small degree of concavity.

EXAMPLE I

A preformed, electronically preheated charge of melamine tableware molding compound commercially obtainable as TWG-22 type of Allied Chemical Corporation, was placed in a 7½ inch bread and butter plate mold maintained at 325°-330° F. and cured for 45 seconds under a pressure of 3500 p.s.i. The mold was then opened and a decorative foil placed on the top surface of the partially cured plate. The mold was again closed for 45 seconds and reopened. 1.5 grams of a high-gloss, stain-resistant granular resinous material prepared from Resin "A" as described above and having a flow time determination of 6 seconds, were placed in the center of the plate and the mold reclosed for 45 seconds. When the mold was opened and the plate removed, the top surface of the plate showed a smooth, hard, continuous and extremely high-gloss surface with a specular gloss of 75 to 80 on a Gardner 20° glossmeter when measured according to the ASTM Method of Test for Specular Gloss, designation D523-53T. Specular gloss of high quality china (e.g., Castleton) was found to be 80-85 when measured by the same test, whereas specular gloss for several ordinary commercial decorated melamine dinner plates and plates made in the same mold without the Resin "A" coating was 35-45 as determined by the same test.

The glossy coating on the special coated plate was 1 to 3 mils thick and commercially cured as measured by the melamine tableware industry's "Acid Boil Test" (parts boiled for 10 minutes in 0.8% solution of sulfuric acid are to show no surface chalking when allowed to dry after the 10-minute boil period). When subjected to 3 cycles of a "Thermal shock" test (such as is commonly used in the tableware industry as a measure of serviceability) wherein plates are held at 275° F. for 30 minutes in a circulating air oven and then quenched in water at 60° F., the coating on the special plate showed no cracking or crazing and the film exhibited perfect adhesion to the substrate over the entire top surface.

EXAMPLE II

A high-gloss plate was molded as in Example I except that 1.5 grams of a high-gloss, stain-resistant granular resinous product prepared from Resin "B" instead of Resin "A" was used. This material had a flow time of 7 seconds. The cure time for this coating was 90 seconds. The resulting plate was identical to that of Example I in general appearance, gloss rating and test performance as measured by the acid boil test and the thermal shock test.

Sections of plates from Examples I and II were tested for resistance to food stain by immersing them in beet juice maintained at 180° F. for 24 hours. A section from a commercial decorated melamine dinner plate was included as a control. Results of this test were as follows:

Control—Severely stained.
Example I—Resin "A"—Slightly stained.
Example II—Resin "B"—Unstained.

Measurement of the coatings on the plates of Examples I and II showed them to be of a thickness of from 1 to 4 mils.

EXAMPLE III

A preformed, preheated charge of melamine tableware molding compound was placed in the plate mold as in Example I and cured for 45 seconds. The mold was opened, a decorative foil was placed on the top surface of the plate, the mold was closed for 45 seconds and reopened. 1.5 grams of an unfilled powdered melamine-formaldehyde resinous product ("Cymel" 405, produced by American Cyanamid Company) having a flow time of 1 second were placed in the center of the plate and the mold closed. A five-minute cure was necessary in order to obtain a blister-free coating. While some of this material flashed out of the mold, an appreciable increase in gloss over an uncoated plate was obtained.

EXAMPLE IV

A preformed, preheated charge of melamine tableware molding compound was placed in the plate mold as in Example I and cured for 45 seconds. The mold was opened, a decorative foil was placed on the top surface of the plate and the mold reclosed for 45 seconds. The mold was then opened and, as in Examples I, II and III, a 1.5-gram charge of an unfilled melamine-formaldehyde resinous product (in this case, "Cymel" 404 T, produced by American Cyanamid) having a flow time of 24 seconds was placed in the center of the plate. The mold was closed for 1 minute and then opened. The resulting plate was covered with the high-gloss coating over an area only 2½ inches in diameter in the center of the plate. The identical molding process was repeated with a new plate except that the charge weight of the 404 T material was increased to 6 grams. With this charge weight, an area 5 inches in diameter in the center of the 7½-inch plate was covered with a high-gloss surface. The exact molding procedure was again repeated except that the charge weight of the special resin was increased to 10 grams. With a 10-gram charge, the high-gloss area covered a diameter of approximately 6½ inches, the resin having failed to flow to the plate edge at any point.

The plate having the 10-gram charge weight was then subjected to the acid boil and thermal shock tests described in Example I. The plate passed the acid boil test; however, on the first cycle of the thermal shock test (see under Example I) the high-gloss film developed a series of crack lines over a wide area of the plate, thus indicating that films of this thickness possess considerable unrelieved stress which is far more likely to cause cracking under the abrupt temperature changes of actual use than the plates in Examples I and II. A further defect of this plate was its somewhat "pebbly" surface. This objectionable surface appearance was caused by the relatively stiff plasticity of this unfilled resinous compound when an attempt was made to flow it into the very thin desired 1–4 mil film thickness.

Examples of the invention applied to the making of improved high-gloss and stain-resistant coffee cups are given below:

Example V

The flow times of five different insert materials were determined as described previously under the heading "Fow Time Determination" with the following results:

TABLE I

| "Insert" Material Designation | Resin | Flow Time |
| --- | --- | --- |
| Resin "1" | "Cymel" 405 (Melamine Laminating Resin Made by American Cyanamid). | 1 second. |
| Resin "2" | Resin "A," described previously | 2 seconds. |
| Resin "3" | Resin "B," described previously | 7 seconds. |
| Resin "4" | Resin "B" heated at 180° F. for 3 hours to make it stiffer. | 12 seconds. |
| Resin "5" | An unfilled melamine-formaldehyde molding resin commercially available as "Cymel" 404 T, produced by American Cyanamid. | 24 seconds. |

Coffee cup "insert" films per se were molded using the five resins given above in Table I, and the plasticity or viscosity testing technique described above. Results of the tests are given below in Table II.

TABLE II

Resin "1"—The insert resin flowed completely up the sides of the cup. A small amount of the insert resin flashed out of the mold.

Resin "2"—The insert resin flowed completely up the sides of the cup. No flashing was apparent.

Resin "3"—The insert resin did not flow completely up the sides of the cup consistently. A complete insert could be molded consistently, however, if shims of 0.002 inch thickness were placed between the mold halves before the mold was closed on the insert material. This procedure assures the liquid-like resinous product room in which to flow and completely coat the inner surface of the cup.

Resin "4"—The insert resin flowed only about half-way up the sides of the cup. The use of shims had very little effect on the height of resin flow up the cup side.

Resin "5"—The insert resin flowed less than half-way up the sides of the cup. The use of shims had very little effect on the height of resin flow up the cup side.

Summarizing the foregoing, an insert material with a flow time of 7 seconds is borderline for molding stain-resistant coffee cup inserts in accordance with the invention unless the shim technique is employed, while a material with a flow time of 2 seconds will produce consistently good, complete inserts without the use of shims. It follows therefore, that 1 to 7 seconds flow time is the maximum range of plasticity acceptable for insert molding material, with the optimum being 2 to 5 seconds.

Example VI

A single-cavity coffee cup mold maintained at 320°–325° F. was charged with a preheated preform of melamine tableware molding compound. The mold was closed and the material allowed to cure for 1¾ minutes. The mold was then opened and 1.5 grams of granulated melamine resin prepared from resin solution "A" (above) having a flow time of 2 seconds were placed in the bottom of the cup, and the mold was slowly closed. After 120 seconds the mold was opened and the cup removed. The inner surface of the cup was found to be completely coated with a transparent, shiny layer of resin of 0.002 to 0.004 inch thickness. The coating did not crack when subjected to boiling water thermal shock tests and 50 cycles in an automatic dishwashing machine.

The boiling water thermal stock test in this case comprised filling the cups with boiling water, allowing them to stand 10 minutes, and then emptying, drying and allowing them to cool to room temperature. The cycle was then repeated 50 times. Ten cups were tested in this manner and no cracking or crazing of the insert films occurred. They were also exceedingly resistant to staining when subjected to 8 hours of boiling in strong coffee solutions containing milk and sugar.

Example VII

A single cavity coffee cup mold maintained at 320°–325° F. was charged with a preheated preform of melamine tableware molding compound. The mold was closed and the material allowed to cure for 1½ minutes. The mold was then opened and 1.5 grams of a granulated melamine-benzoguanamine resin prepared from resin solution "B" (above) having a flow time of 4 seconds were placed in the bottom of the cup and the mold was slowly closed. After 1½ minutes, the mold was opened and the cup removed. The inner surface of the cup was found to be completely coated with a transparent, shiny layer of 0.002 to 0.004 inch thickness. The coating did not crack when subjected to the boiling water thermal shock tests described in Example VI and 50 cycles in an automatic dishwashing machine. It was also exceedingly resistant to staining when subjected to 8 hours of boiling in strong coffee solutions containing milk and sugar.

The insert films on cups from Examples V and VI, above, demonstrate a pronounced superiority in coffee stain resistance over cups having the conventional unprotected alpha cellulose-filled surface. In addition, the benzoguanamine-melamine film shows superior stain resistance compared with the melamine insert film of the invention.

Coffee stain testing procedures and results are described below for cups surfaced with the two materials:

One pound of coffee is placed in a cheesecloth bag and suspended in 2½ gallons boiling water for 30–45 minutes, then 250 grams sugar and ½ pint cream are added.

Test procedure

The test cups are boiled for one hour in the above coffee solution. At the end of this boiling period the cups are placed in an automatic home dishwasher and run through a standard washing cycle using "Finish" (Economics Laboratory, Inc.) dishwashing compound recommended for home washers. Upon completion of the washing cycle, the test pieces are placed in a 120° F. oven for one hour, which completes one test cycle.

Stain-resistant melamine coffee cups molded as described in Examples VI and VII above, and melamine coffee cups without stain-resistant inner liners were given the coffee stain test as outlined above. In order to compare the rate and degree of stain for the samples tested, the following numerical values were established for the varying degrees of stain.

0—No stain
1—Trace of stain
2—Very slight stain
3—Slight stain
4—Stained
5—Severely stained Results of the tests are given below in Table III.

TABLE III

|  | Number of Test Cycles | | | | | | | |
| --- | --- | --- | --- | --- | --- | --- | --- | --- |
|  | 1 | 2 | 3 | 4 | 5 | 6 | 7 | 8 |
| Example VI | 0 | 0 | 0 | 0 | 0 | 0 | 1 | 1 |
| Example VII | 0 | 0 | 0 | 0 | 0 | 0 | 0 | 0 |
| Unlined Cup | 0 | 0 | 1 | 2 | 3 | 4 | 5 | 5 |

Having thus set forth several specific embodiments of the process and the products of the present invention merely as illustrative thereof, it is to be understood that various changes and modifications may be made by those skilled in the art without departing from the spirit of the invention claimed. Merely by way of example, the initial mold charge may comprise mixtures of the amines specified, as well as various additives and fillers. Similarly, the "insert" resin material may likewise comprise mixtures of the specified amines, as well as additives other than the optical brighteners and/or pigments and dyes referred to herein. The temperatures and pressures (and time intervals that they are applied) during the steps of the entire molding operation may be varied as desired with partial dependence upon the materials employed. The mold cavity may be moved while the force remains stationary or both elements of the mold may be movable. It will be understood that other changes are possible and are intended to be covered by the appended claims.

We claim:

1. A process of producing a molded thermoset object of dished configuration having a glossy, stain-resistant generally concave surface that comprises: introducing into a molding zone a charge comprising a molding compound of a fusible, thermosetting resin of the group consisting of urea- and melamine-aldehyde resins; forming said charge into an object of dished configuration and partially curing the thermosetting resin; introducing, in granular form, on the resulting generally concave surface of the dished object and substantially centrally thereof, a second, fusible, thermosetting resin of the group consisting of melamine- and benzoguanamine-aldehyde resins and which, as measured by "Flow Time Determination," has a flow time of from 1 to 15 seconds; molding said dished object, while the generally concave surface thereof faces upwardly, with said second, fusible, thermosetting resin thereon by applying a downwardly directed force to said surface at a rate to cause flow of said second, fusible, thermosetting resin uniformly over said surface of said object prior to final curing of said charge and said fusible, thermosetting resin thereon; and thereafter, continuing molding of said object until said charge and said flowed resin thereon are finally cured as an integral object.

2. A process of producing a molded thermoset object of dished configuration having a glossy, stain-resistant, generally concave surface that comprises: introducing into a molding zone, a dry, solid charge comprising a molding compound of a fusible, thermosetting resin of the group consisting of urea- and melamine-aldehyde resins; molding said charge by the application of heat and a downwardly directed force, into a partially cured molded object of dished configuration; introducing on the generally concave surface of the dished object and substantially centrally thereof, while the latter is still in the molding zone, a granular, fusible, thermosetting resin of the group consisting of melamine- and benzoguanamine-aldehyde resins and which, as measured by "Flow Time Determination," has a flow time of from 2 to 10 seconds; continuing molding of said charge with said granular, fusible, thermosetting resin thereon by the application of heat and a downwardly directed force, at a rate to cause flow of said granular, fusible, thermosetting resin uniformly over the generally concave surface of said object prior to final curing of said charge and said fusible, thermosetting resin thereon; and thereafter, continuing molding by the application of heat and pressure until said charge and said flowed resin thereon are finally cured as an integral object.

3. A process of producing a molded thermoset object of dished configuration as claimed in claim 1, wherein said granular, fusible, thermosetting resin comprises a reaction product of from 1.5 to 6 mols of formaldehyde per mol of melamine, and the charge of molding compound is introduced in the form of a dry solid.

4. A process of producing a molded thermoset object of dished configuration as claimed in claim 1, wherein said granular, fusible, thermosetting resin comprises a reaction product of from 1.5 to 6 mols of formaldehyde per mol of a mixture of melamine and benzoguanamine, said mixture comprising a molar proportion of benzoguanamine to melamine of from 1:1 to 1:8, and the charge of molding compound is introduced in the form of a dry solid.

5. A process of producing a molded thermoset plate having a glossy, stain-resistant surface that comprises: introducing into a plate mold, a charge comprising a molding compound of a fusible, thermosetting resin of the group consisting of urea- and melamine-aldehyde resins; forming said charge by the application of heat and a downwardly directed force into a partially cured molded plate having a generally concave upper surface; introducing, in granular form, on the upper, generally concave, surface of said plate and substantially centrally thereof, while the latter is still in the plate mold, a second, fusible, thermosetting resin of the group consisting of melamine- and benzoguanamine-aldehyde resins, and which, as measured by "Flow Time Determination," has a flow time of from 2 to 7 seconds; continuing molding of said plate with said second, fusible, thermosetting resin thereon by the application of heat and pressure at a rate to cause flow of said second, fusible, thermosetting resin uniformly over the upper, generally concave, surface of said plate prior to final curing of said charge and said fusible, thermosetting resin thereon; and thereafter, continuing molding by the application of heat and a downwardly directed force until said plate and said flowed resin thereon are finally cured as an integral plate.

6. A process of producing a molded thermoset plate as claimed in claim 5, wherein a decorative foil is placed on the generally concave upper surface of said plate after it is partially cured, and heat and pressure are applied thereto prior to introduction thereon of said granular, fusible thermosetting resin.

7. A process of producing a molded thermoset plate as claimed in claim 5, wherein said granular, fusible, thermosetting resin comprises a reaction product of melamine and formaldehyde in the molar ratio of about 1 to 2.1, and the charge of molding compound is introduced in the form of a dry solid.

8. A process of producing a molded thermoset plate as claimed in claim 5, wherein said granular, fusible, thermosetting resin comprises a reaction product of 2.1 mols of formaldehyde per mol of a mixture comprising melamine and benzoguanamine in molar proportion of about 6 to 1, and the charge of molding compound is introduced in the form of a dry solid.

9. A process of producing a molded thermoset cup having a glossy, stain-resistant surface that comprises: introducing into a cup mold, a dry, solid charge comprising a molding compound of a fusible, thermosetting resin of the group consisting of urea- and melamine-aldehyde resins; forming said charge by the application of heat and a downwardly directed force into a partially cured molded cup; introducing on the upper, generally concave, surface of said cup and substantially centrally thereof, while the latter is still in the cup mold, a granular, fusible, thermosetting resin of the group consisting of melamine- and benzoguanamine-aldehyde resins and which, as measured by "Flow Time Determination," has a flow time of about 7 seconds; continuing molding of said cup with said granular, fusible, thermosetting resin thereon by the application of heat and said downwardly directed force at a rate to cause flow of said granular, fusible, thermosetting resin and limiting the travel of said force to permit said resin to flow uniformly over the upper, generally concave, surface of said cup prior to final curing of said charge and said fusible, thermosetting resin thereon; and thereafter, continuing molding by the application of heat and a downwardly directed force until said cup and said flowed resin thereon are finally cured as an integral cup.

10. A process of producing a molded thermoset object of dished configuration having a glossy, stain-resistant, generally concave surface that comprises: introducing into a molding zone, a dry, solid charge comprising a molding compound of a fusible, thermosetting resin of the group consisting of urea- and melamine-aldehyde resins; molding said charge by the application of heat in the temperature range of from 300° to 350° F. and a downwardly directed force in the pressure range of from 2000 to 8000 p.s.i. for a period of from 25–70 seconds, to form a partially cured molded object of dished configuration; introducing on the resulting generally concave surface of said object and substantially centrally thereof, while the latter is still in the molding zone, a granular, fusible, thermosetting resin of the group consisting of melamine- and benzoguanamine-aldehyde resins, and which, as measured by "Flow Time Determination," has a flow time of from 1 to 15 seconds; continuing molding of said charge with said granular, fusible, thermosetting resin thereon by the application of heat and a downwardly directed force at a rate to cause flow of said granular, fusible, thermosetting resin uniformly over the generally concave surface of said object prior to final curing of said charge and said fusible, thermosetting resin thereon; and thereafter, continuing molding by the application of heat in the temperature range of from 300° to 350° F. and said downwardly directed force in the pressure range of from 2000 to 8000 p.s.i. for a period of from 20 to 90 seconds whereby said charge and said flowed resin thereon are finally cured as an integral object.

11. A process of producing a molded thermoset object of dished configuration having a glossy, stain-resistant generally concave surface as claimed in claim 10, wherein a resin-impregnated decorative foil is applied to the resulting generally concave surface of said partially cured molded object of dished configuration and molding is continued by application of heat in the temperature range of from 300° to 350° F. and the downwardly directed force in the pressure range of from 2000 to 8000 p.s.i. for a period of from 15–45 seconds, prior to introduction of the granular, fusible, thermosetting resin.

References Cited
UNITED STATES PATENTS

| 2,244,565 | 6/1941 | Nast | 18—61 |
| 2,646,380 | 7/1953 | Barlow et al. | 18—61 |
| 2,602,192 | 7/1952 | Silberkraus | 18—61 |
| 2,781,553 | 2/1957 | Varela et al. | 18—60 |

ROBERT F. WHITE, *Primary Examiner.*

R. R. KUCIA, *Assistant Examiner.*